United States Patent [19]

Kurland

[11] 4,339,992
[45] Jul. 20, 1982

[54] STIRRING APPARATUS

[76] Inventor: Elaine J. Kurland, 5711 S. Albany, Chicago, Ill. 60629

[21] Appl. No.: 191,891

[22] Filed: Sep. 29, 1980

[51] Int. Cl.³ .............................................. B01F 7/16
[52] U.S. Cl. ...................................... 99/348; 366/342; 366/343; 366/605
[58] Field of Search ............... 366/341, 342, 343, 344, 366/601, 605; 99/348

[56] References Cited

U.S. PATENT DOCUMENTS

| | | | |
|---|---|---|---|
| 1,808,353 | 6/1931 | Jackson | 366/342 |
| 2,805,843 | 9/1957 | Block | 366/343 |
| 3,580,550 | 5/1971 | Hunnicutt | 366/343 |
| 3,697,053 | 10/1972 | Will | 99/348 |
| 3,751,013 | 8/1973 | Schroeder | 366/343 |

FOREIGN PATENT DOCUMENTS

| | | | |
|---|---|---|---|
| 2356397 | 1/1978 | France | 99/348 |
| 9206 | of 1900 | United Kingdom | 99/348 |

*Primary Examiner*—Edward J. McCarthy
*Attorney, Agent, or Firm*—Bernard L. Kleinke

[57] ABSTRACT

A stirring apparatus includes a motive device, such as a motor, fixedly mounted on a support brace adapted to extend across the open top portion of a container. A paddle is connected releasably to a connector, which, in turn, is driven rotatably by the motive device. The paddle extends into the interior of the container for revolving about its axis for stirring the contents thereof. The support brace includes a device to enable the length of the brace to be adjusted longitudinally so that the brace can fit over different size container openings, and has devices for securing it releasably to the container. A plurality of different size interchangeable paddles are provided and each one is adapted to be connected removably to the motive means so that the paddles can be interchanged readily and can be cleaned easily.

10 Claims, 8 Drawing Figures

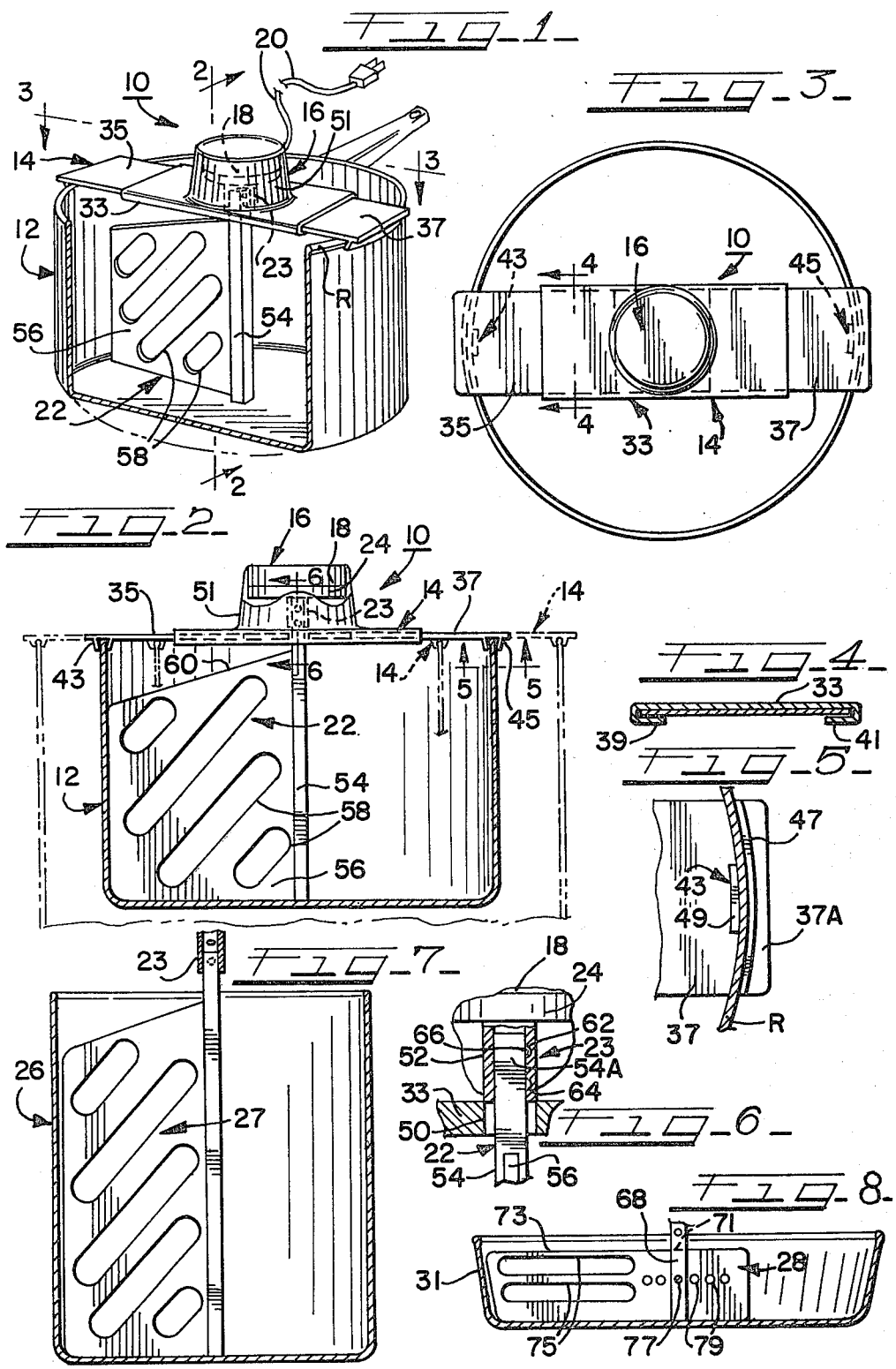

STIRRING APPARATUS

TECHNICAL FIELD

The present invention relates in general to stirring apparatus, and more particularly relates to apparatus adapted to be mounted on existing containers, such as cooking utensils, for stirring the contents thereof.

BACKGROUND ART

There have been different types and kinds of apparatus for stirring the contents of a container. For example, reference may be made to the following U.S. Pat. Nos.: 2,440,322; 2,851,258; 3,322,403 and 4,155,656. Each one of the devices shown in the aforementioned patents discloses stirring or mixing equipment built into a container for dispersing the contents thereof. While each one of the devices shown in the aforementioned patents may be satisfactory for some applications, it would be highly desirable to have an apparatus which is adapted to be mounted on an existing container, such as a cooking utensil, for stirring the contents thereof. In this regard, such a new and improved stirring apparatus is adapted to be mounted on an existing pot or pan, for stirring the contents thereof while it is being prepared. For example, a person preparing a comestible item, such as soup, a sauce, or the like, requiring stirring thereof while applying heat thereto, can leave the cooking utensil unattended on a stove as the comestible item is being heated and is being stirred automatically. Such an apparatus should be adapted to fit different size containers, such as different diameter pots and pans and different depths thereof. Also, such an apparatus should be relatively inexpensive to manufacture and easily cleanable.

DISCLOSURE OF INVENTION

Therefore, the principal object of the present invention is to provide a new and improved stirring apparatus which is adapted to be used in connection with existing containers, and which is adapted to fit different size containers.

Another object of the present invention is to provide such a new and improved stirring apparatus, which is relatively inexpensive to manufacture, and which is easily cleanable.

Briefly, the above and further objects of the present invention are realized by providing stirring apparatus, which includes a motive device, such as a motor, fixedly mounted on a support brace adapted to extend across the open top portion of a container. A paddle is connected releasably to a connector, which, in turn, is driven rotatably by the motive device. The paddle extends into the interior of the container for revolving about its axis for stirring the contents thereof. The support brace includes a device to enable the length of the brace to be adjusted longitudinally so that the brace can fit over different size container openings, and has devices for securing it releasably to the container. A plurality of different size interchangeable paddles are provided and each one is adapted to be connected removably to the motive means so that the paddles can be interchanged readily and can be cleaned easily.

BRIEF DESCRIPTION OF THE DRAWINGS

The above-mentioned and other objects and features of this invention and the manner in attaining them will become apparent, and the invention itself will be best understood by reference to the following description of embodiments of the invention taken in conjunction with the accompanying drawings, wherein:

FIG. 1 is a pictorial fragmentary view of the stirring apparatus, which is constructed in accordance with the present invention, and which is shown mounted on a cooking utensil;

FIG. 2 is a cross-sectional elevational view of the apparatus of FIG. 1;

FIG. 3 is an enlarged plan view of the apparatus of FIG. 1;

FIG. 4 is a cross-sectional view of the apparatus of FIG. 3 taken substantially long the line 4—4 thereof to illustrate the manner in which the brace can be adjusted longitudinally;

FIG. 5 is a cross-sectional view of the apparatus of FIG. 2 taken substantially long the line 5—5 thereof to illustrate the manner in which the brace is fixed releasably to the cooking utensil;

FIG. 6 is an enlarged cross-sectional fragmentary view of the connector for the motive means of the present invention;

FIG. 7 is a cross-sectional elevational view of the apparatus of FIG. 1 showing a different stirring paddle for the apparatus of the present invention; and FIG. 8 is another cross-sectional elevational view of the apparatus of FIG. 1 showing a different stirring paddle for use with a shallow pan.

BEST MODE FOR CARRYING OUT THE INVENTION

Referring now to the drawings, and more particularly to FIGS. 1, 2, 3, 4 and 5 thereof, there is shown a stirring apparatus 10, which is constructed in accordance with the present invention, and which is shown mounted on a container 12 in the form of a pot for stirring the contents thereof. While the stirring apparatus 10 of the present invention is shown and described to be used in connection with cooking utensils, it is to be clearly understood that the apparatus 10 of the present invention may also be used for the purpose of stirring or mixing other materials, such as paint or the like.

The stirring apparatus 10 generally comprises a brace or cross-arm 14 which extends across and is clamped in place on a rim R of the container 12, and carries a motive device 16, which includes an electric motor 18 having a power cord 20. It is to be understood that other types and kinds of motive devices, such as mechanical wind-up motors including timers, may also be used as will be understood by those skilled in the art.

As best seen in FIGS. 2 and 6 of the drawings, a stirring paddle 22 is disposed within the container 12 and is releasably and drivingly coupled by means of a connector 23 to the output shaft (not shown) of the electric motor 18 via a suitable gear box 24. When the electric motor 18 is energized via the cord 20, the paddle 22 revolves about its vertical axis to disperse the contents (not shown) of the container 12.

In order to enable the apparatus 10 to be used in connection with various different sizes of containers and to enable the paddles to be cleaned easily, a plurality of interchangeable similar paddles quickly changeable for different depths of containers, are employed. For example, as shown in FIG. 7 of the drawings, in order to use the apparatus 10 with a deep container 26 in the form of a pot, a stirring paddle 27 is connected releasably to the connector 23 of the motive device 16 for stirring the contents of the container 26. Similarly, as shown in FIG. 8 of the drawings, a stirring paddle 28 may be connected to the connector 23 (not shown in FIG. 8 for illustration purposes) for enabling the contents of a shallow container 31 in the form of a pan, to be stirred as hereinafter described in greater detail.

Also, as will be explained in further detail, the stirring paddle 28 is also adjustable to accommodate different diameters of containers.

Considering now the cross-arm 14 in greater detail with particular reference to FIGS. 1, 2 and 3 of the drawings, the cross-arm 14 includes an outer telescoping member 33 which has a pair of inner telescoping arms 35 and 37 slidably connected thereto.

Each one of the inner telescoping arms 35 and 37 is in the form of a flat strip or plate. The inner ends of the inner telescoping arms 35 and 37 are slidably received within the outer telescoping member 33 as best seen in FIG. 4 of the drawings. The outer telescoping member has a pair of reversely-bent end flanges 39 and 41 to tightly grip the inner telescoping member 35 as best seen in FIG. 4 of the drawings. In this regard, the inner telescoping member 35 is slidably mounted within the outer member 33 in a similar manner as the member 37 is slidably mounted within the other end of the outer telescoping member 33. In this manner, the inner members 35 and 37 fit snugly within the outer member 33 so that they can be moved inwardly or outwardly relative to the outer member 33 to adjust selectively the overall length of the brace 14. By merely pulling either one or both of the members 35 and/or 37 outwardly or inwardly relative to the member 33 for adjusting them positionally, the members 35 and 37 remain securely in their adjusted positions. As a result, the brace 14 can be lengthened or shortened according to the exact diameter of the rim of the container upon which the apparatus 10 is to be mounted.

The outer ends of the inner members 35 and 37 have respective retaining devices 43 and 45 which clamp onto the rim R to secure releasably the stirring apparatus 10 in position. Each one of the retaining devices is similar to one another and therefore only the device 43 will now be described in greater detail with particular reference to FIG. 5 of the drawings. The device 43 includes a longer outer arcuate downwardly depending flange 47 which is spaced apart from a shorter inner depending arcuate flange 49 for gripping snugly and releasably the rim R of the container 12. In this manner, the outer end of the inner member 37 may be pressed downwardly over the rim R to wedge itself between the flanges 47 and 49. In this regard, the device 43 snaps into engagement with the rim R. An outer portion 37A of the inner member 37 extends slightly beyond the outer flange 47 to be gripped conveniently by the fingers of the user to pull upwardly on the member 37 to release it from the rim R by causing the retaining device 43 to snap out of engagement with the rim R for removing the apparatus 10 from the container 12.

As shown in FIG. 2 of the drawings, by adjusting the overall length of the brace 14, the apparatus 10 can be mounted on either a smaller diameter container or a larger diameter container as indicated in broken lines in FIG. 2 of the drawings.

As best seen in FIG. 6 of the drawings, the outer telescoping member 33 has a centrally disposed opening or hole 50, which is axially aligned with inverted cup-shaped housing 51 for the motive device 16. In this manner, the motor 18 and the gear box 24 are mounted within the housing 51, and the connector 23 is disposed between the gear box 24 and the opening 50 in the brace 14. The housing 51 is suitably connected to and carried by the member 33.

The connector 23 generally comprises a rigid tubular member 52 which is generally square or rectangular in cross section throughout its length for receiving an upper end portion 54A of a vertical shaft 54 for the paddle 22, as best seen in FIG. 6 of the drawings. A flat blade 56 of the paddle 22 is generally rectangular in shape and is fixed at one of its end edges to the shaft 54, which is generally square or rectangular in cross section throughout its length. Preferably, the paddle 22 is composed of unitary one-piece construction and is preferably composed of a suitable plastic material to facilitate cleaning thereof. A series of elongated holes 58 extend through the face of the blade 56 to enable the blade 56 to more readily pass through the contents of the container 12 during the stirring operation, thereby placing less resistance on the blade 56 as the paddle 22 revolves about its vertical axis.

The holes 58 extend diagonally and are equally spaced apart. The ends of the holes 58 are rounded to provide an elongated oval shape.

The blade 56 is generally rectangular in shape and has an upper edge 60 which is inclined downwardly from the shaft 54.

In order to releasably connect the upper end 54A of the shaft 54 to the connector 23, as shown in FIG. 6 of the drawings, the connector 23 has a pair of vertically spaced-apart recesses 62 and 64 which receive selectively an outwardly projecting bead or abutment 66 on the upper end 54A of the shaft 54. In this regard, the upper end 54A is slipped through the central opening 50 in the member 33 and into the tubular member 52 until the bead 66 snaps into engagement with one of the recesses 62 or 64. By providing two recesses vertically spaced apart, the vertical position of the paddle 22 can be adjusted slightly for different depths of containers. When a much deeper container is used, a different paddle, such as the paddle 27 of FIG. 7, is employed.

In order to remove the paddle 22 for cleaning or interchanging purposes, the apparatus 10 is snapped out of engagement with the container 12 and the paddle 22 is gripped and pulled away from the connector 23 so that the upper end portion 54A snaps out of engagement with the connector 23.

Referring now to FIG. 8 of the drawings, the paddle 28 is generally similar to the paddle 22, but the paddle 28 includes a rigid shaft 68 and has an opening 71 for receiving the generally rectangularly-shaped thin flat blade 73 so that the blade 73 can be adjusted positionally relative to the shaft 68 to accommodate various different diameters of shallow containers. A pair of elongated spaced-apart horizontally extending holes 75 are provided in the face of the blade 73 in a similar manner as the holes 58 of the paddle 22.

In order to fasten releasably the blade 73 to the shaft 68, a fastening device 77, such as a screw, snap or the like, moves into engagement with one of a series of equally spaced-apart small circular holes 79 in the blade 73.

Referring again to the paddle 56 as best seen in FIG. 2 of the drawings, the blade 56 extends downwardly into engagement with the bottom wall of the container 16. Thus, the bottom edge of the blade 56 scrapes the container bottom wall as the paddle 22 rotates about its vertical axis to help prevent the contents of the container from burning during the food preparation process. The blade 56 is sufficiently thin and flexible to enable the blade 56 to flex slightly as it rotates and thus drags or sweeps along the container bottom wall. Similarly, the blade 56 extends radially to the side wall of the container 16 to help prevent the contains therein from burning.

I claim:

1. In stirring apparatus adapted to be mounted on an open-top container for dispersing materials contained therein, said container having a bottom wall, the arrangement comprising:

a support brace adapted to extend across the top portion of the container over its open top;

motive means fixedly mounted on said brace and having depending connector means drivingly attached thereto;

a downwardly depending paddle drivingly connected to said connector means of said motive means for extending into the interior of the container and revolving therewith, said paddle including an upright shaft portion attached to said connector means and extending directly downwardly into said container, said paddle further including a flat flexible blade, said blade extending downwardly from said connector means into engagement with the bottom wall of the container, said blade extending radially from said shaft portion; and said support brace being adjustable longitudinally so that said brace can fit over different size container openings, said support brace further including securing means for attaching releasably said brace to said container, said support brace including a first central member having said motive means centrally disposed thereon, second and third rim engageable members connected telescopically to opposite ends of said first member to enable the length of said brace to be adjusted longitudinally, at least one of said members being a flat plate, said shaft portion of said blade being connected drivingly to said motive means to revolve the blade about the vertical axis of said shaft portion for dispersing the contents of the container and to sweep the bottom wall of the container.

2. In the stirring apparatus, the arrangement according to claim 1, further including means for connecting removably said paddle to said motive means.

3. In the stirring apparatus, the arrangement according to claim 2, further including a plurality of different sized interchangeable blades, each one having a shaft adapted to be connected removably to said motive means.

4. In the stirring apparatus, the arrangement according to claim 3, each one of said paddles including a shaft and a blade extending therefrom.

5. In the stirring apparatus, the arrangement according to claim 4, wherein each one of said blades includes a plurality of openings extending therethrough to facilitate the movement of the blade through the materials to be stirred.

6. In the stirring apparatus, the arrangement according to claim 5, wherein each one of said openings being elongated in shape and having rounded end portions.

7. In the stirring apparatus, the arrangement according to claim 4, wherein said shaft includes an opening for receiving the blade which extends laterally therethrough, said blade having a series of small holes therein, fastening means cooperating with one of said small holes for securing releasably said blade to its shaft so that the blade can be moved laterally relative to its shaft and secured in an adjusted position.

8. In the stirring apparatus, the arrangement according to claim 4, wherein said means for connecting includes a tubular member for receiving the upper end of the paddle shaft, means on said member and on said shaft for attaching releasably said shaft and said member.

9. In the stirring apparatus, the arrangement according to claim 4, wherein said securing means includes a pair of spaced-apart depending flanges to receive the rim of the container.

10. In the stirring apparatus, the arrangement according to claim 1, wherein said second and third members are both flat plates, said first member being an outer telescoping member for receiving the ends of said second and third members.

* * * * *